INVENTOR
BERNARD J. WALLIS
BY
Barnes, Kisselle, Raisch & Choate
ATTORNEYS

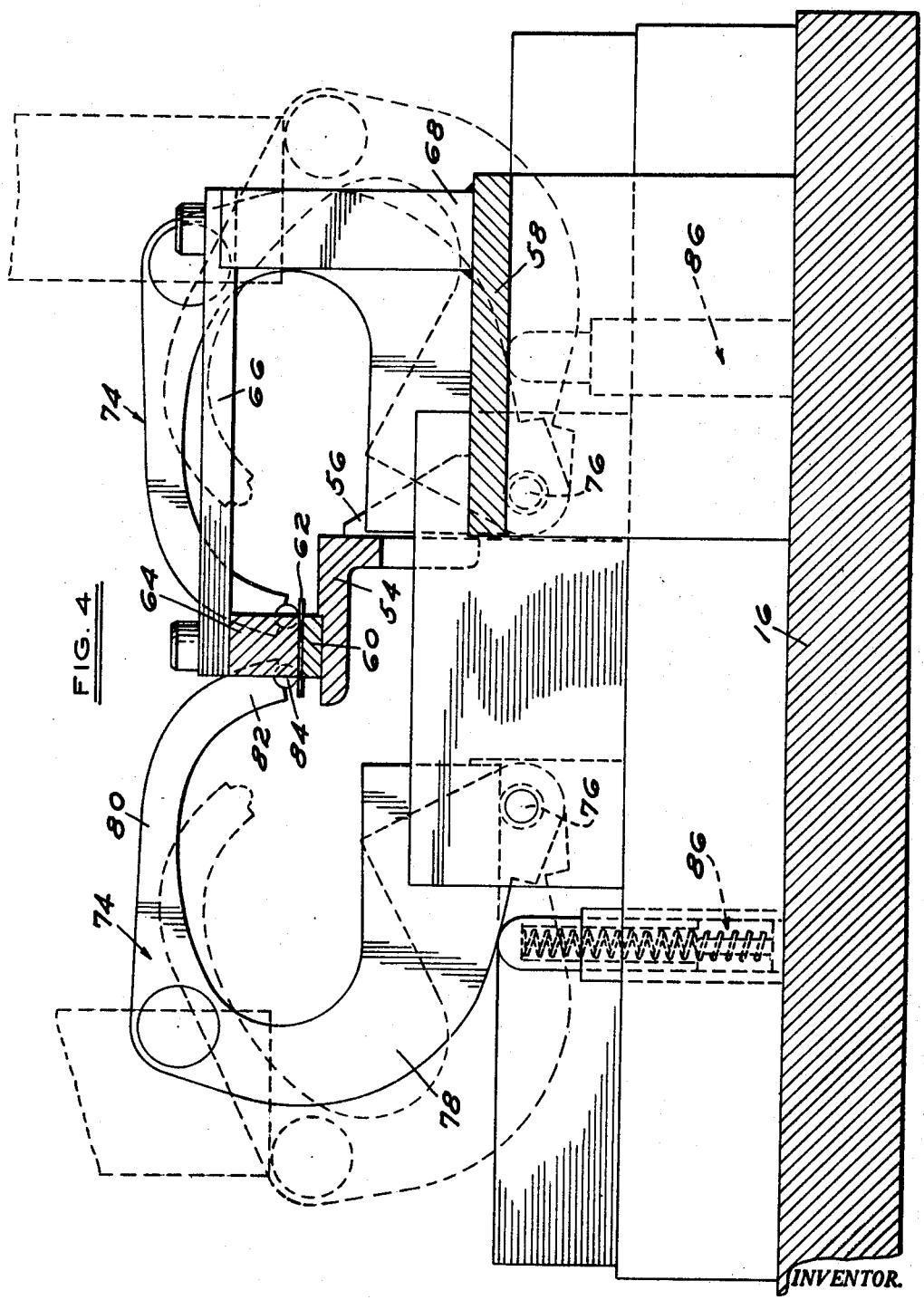

United States Patent Office 3,393,594
Patented July 23, 1968

3,393,594
HOLD-DOWN ARRANGEMENT FOR
TRANSFER DIES
Bernard J. Wallis, c/o Livernois Engineering Co., 25200
Trowbridge Ave., Dearborn, Mich. 48120
Filed July 8, 1966, Ser. No. 563,902
14 Claims. (Cl. 83—255)

This invention relates generally to punch presses. More particularly, the invention has to do with punch presses provided with a transfer die and a work transfer mechanism for advancing individual workpieces progressively through the successive stations of such die in a press.

In punch presses provided with an auxiliary transfer mechanism, workpieces are normally transferred between successive stations of the die by a movable work-gripping member or members which move inwardly to grip the workpieces, advance or index the workpiece to the next successive station, move out to release the workpiece and then retract to the starting position. While such an arrangement works very satisfactorily with many types of workpieces, several problems arise in connection with the transfer of relatively flimsy light-weight workpieces. One of these problems has to do with the inertia of the workpieces being transferred. In the case of a press and transfer mechanism working at a relatively high speed, there is a tendency for the workpieces, because of their inertia, to continue moving for a short distance after they are released by the work-gripping members of the transfer mechanism. Thus the workpieces "overshoot" the station to which they are being transferred. Likewise in one of the most common transfer mechanisms used in connection with such transfer dies the work-gripping members move in a direction transverse to the path of workpiece advancement in releasing the workpieces and, due to oil or the like, the cohesion between the workpiece and one of the work-gripping members may be sufficient to shift the workpiece laterally slightly out of the desired position as it is being released by the work-gripping member.

The present invention has for its object the provision of a hold-down mechanism which is designed to engage and retain workpieces in the position to which they are indexed in the transfer die by the transfer mechanism before the work-gripping members of the transfer mechanism release the workpiece.

A further object of the invention resides in the provision of a hold-down mechanism which is adapted to engage the workpieces both during the transfer motion thereof and while the workpieces are being released by the work-gripping members.

A further object of the invention resides in the provision of a hold-down mechanism which is of relatively simple construction and design.

In the drawings:

FIGURE 4 is a sectional view along the line 4—4 in FIG. 1.

Figure 1:
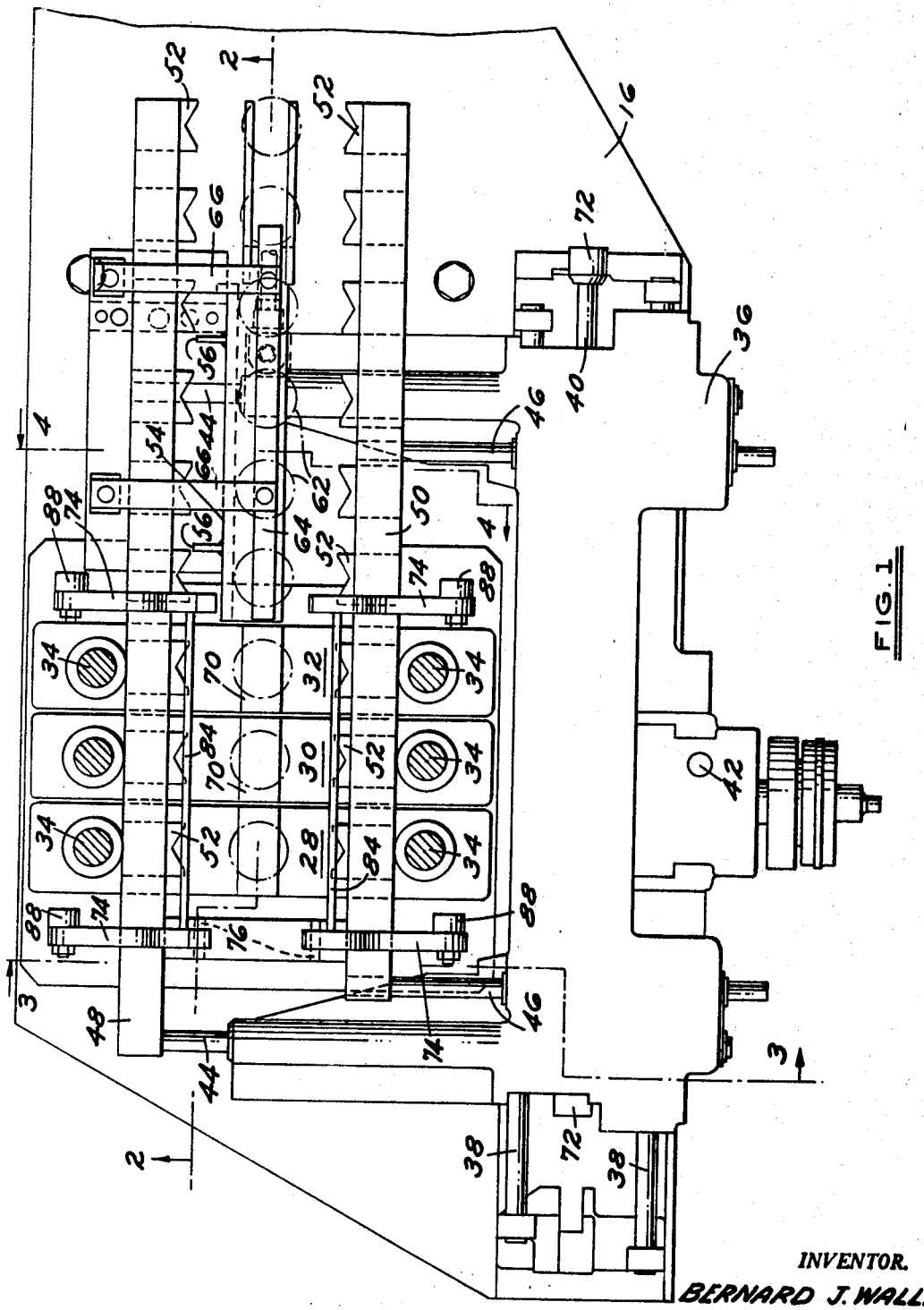
FIGURE 1 is a plan view of the hold-down mechanism of this invention illustrated in connection with a transfer mechanism for a die in a punch press.
Figure 2:
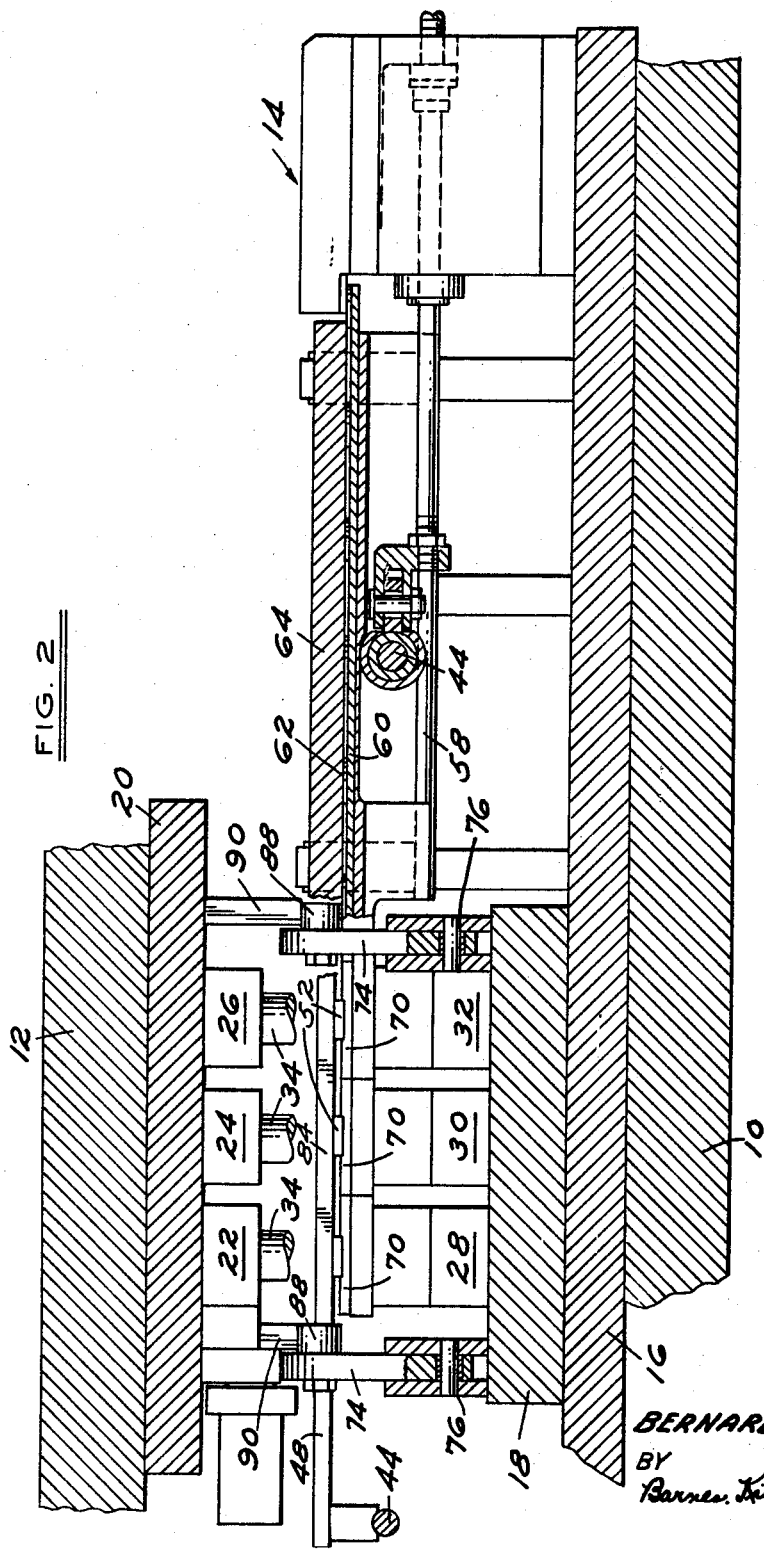
FIGURE 2 is a sectional view taken along the line 2—2 of FIG. 1 and showing a portion of the press on which the mechanism is mounted.

Referring first to FIGS. 1 and 2, there is illustrated a press having a bolster 10 and a vertically movable ram 12. A transfer mechanism, generally designated 14, has a bottom support plate 16 mounted on the bolster 10 of the press. At one end of support plate 16 there is mounted the lower plate 18 of a die set. The upper die plate 20 is secured to the ram 12 of the press. In the embodiment illustrated a series of three punches 22, 24, 26 are supported on the upper die plate 20. The die associated with the punches comprises three sections 28, 30 and 32 which are secured to the lower die plate 18. Gibs, not illustrated, are provided for guiding the movement of ram 12 vertically. In addition, guide pins 34 on upper die 20 are adapted when the ram is lowered to engage in guide bores on the lower die plate 18 to assure exact registration of the punches on the upper die plate 20 with the dies on the lower die plate 18.

Figure 3:
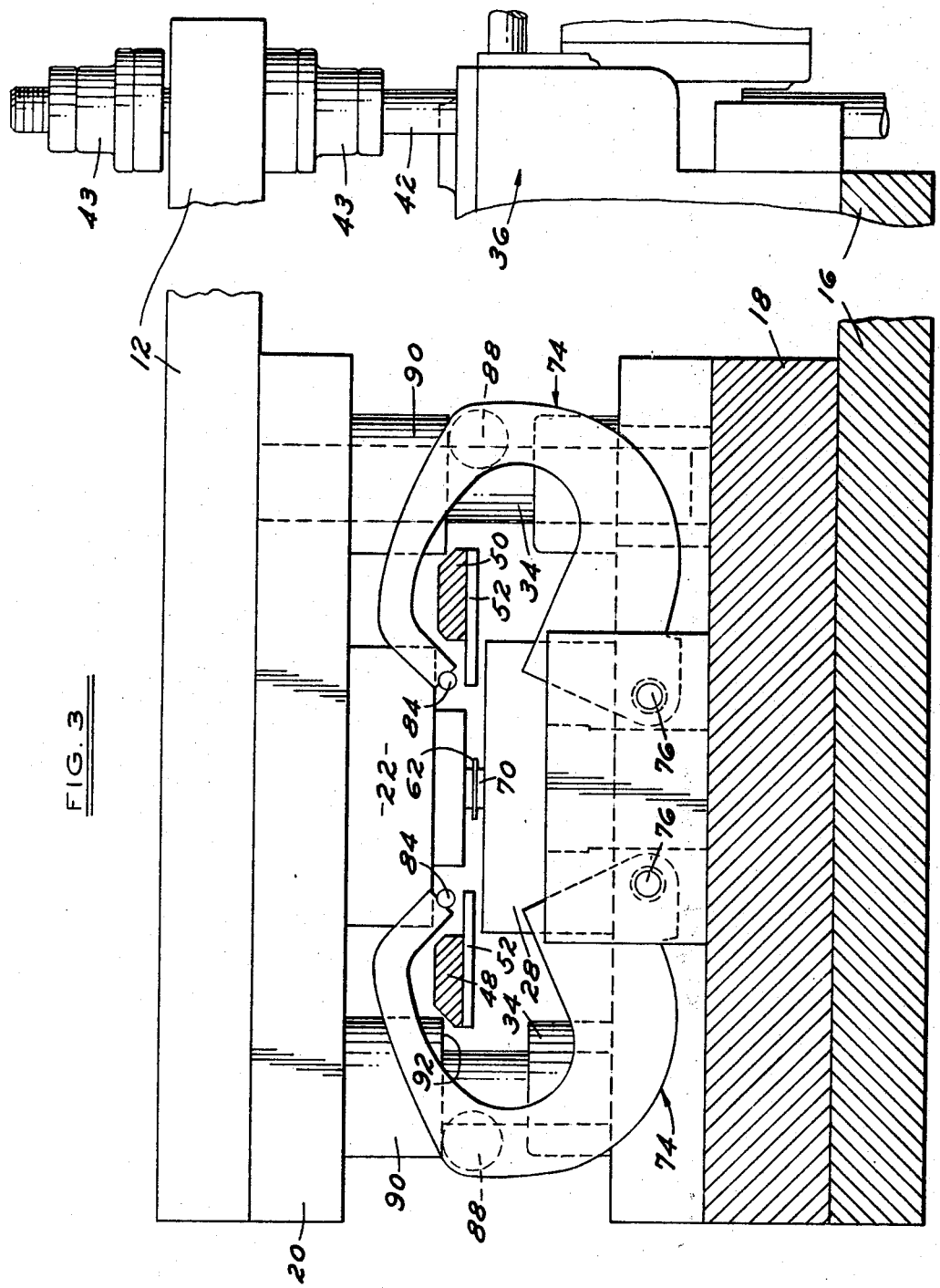
FIGURE 3 is a sectional view taken along the line 3—3 in FIG. 1.

In die arrangements of the above described type, an operation is performed on the workpiece at each successive punch and die. The workpieces are separate and unconnected and means are provided for indexing the workpieces one at a time to the successive stations provided by the dies. In the arrangement illustrated, the work transfer mechanism 14 is generally of the type illustrated in my co-pending application Ser. No. 542,073, filed Apr. 12, 1966. This mechanism includes a casing or carriage 36 supported for lengthwise movement on base plate 16 by a pair of guide bars 38. The means for shifting carriage 36 lengthwise on guide bars 38 comprises an actuator bar 40 connected by gearing within carriage 36, which is not illustrated, with a vertically reciprocal driver 42 connected with ram 12 by adjustable nuts 43 (FIG. 3). Actuator 40 is also interconnected by gearing, not illustrated, with two pair of finger actuating rods designated 44, 46. Rods 44, 46 extend laterally from carriage 36 to one side thereof. Rods 44 are interconnected by a finger bar 48, and rods 46 are interconnected by a finger bar 50. Finger bars 48, 50 have a plurality of work-gripping fingers 52 mounted thereon in uniformly spaced relation.

Located centrally between finger bars 48, 50 at the end of support plate 16 opposite the die structure there is arranged an angled support 54 which is mounted by brackets 56 on a base plate 58. Angled support 54 carries a guide bar 60 on which the workpieces 62 are slidably arranged. A hold-down bar 64 overlies guide bar 60 to prevent vertical displacement of the workpieces 62 supported on guide bar 60. Hold-down bar 64 is mounted at one end of a pair of arms 66, the opposite ends of which are connected to posts 68 on base plate 58. As is shown in FIG. 1, guide bar 60 and hold-down bar 64, terminate at one end adjacent die 32 so that the workpieces 62 can slide in a continuous manner from guide bar 60 to the successive dies. Each die is provided with a spring supported pad 70 adapted to slidably support the workpieces.

The above described transfer mechanism operates generally in the following manner: in FIG. 1 the arrangement is illustrated with press ram in its lowermost position. As the ram 12 starts to ascend from its lowermost position, driver 42 is pulled upwardly which shifts actuator bar 40 to the left as viewed in FIG. 1. The interconnection between actuator bar 40 and rods 44, 46 is such that when actuator bar 40 shifts to the left relative to carriage 36, the two finger bars 48, 50 are moved toward each other so that the work-gripping fingers 52 move into gripping relation with the workpieces slidably arranged between guide bar 60 and hold-down bar 64. Eventually the abutment 72 at the extreme right end of actuator bar 40 engages carriage 36 and shifts carriage to the left to advance the workpieces through a predetermined distance. In the illustrated arrangement, the transfer distance corresponds to the distance between the centers of the successive dies. Transfer of the workpieces is completed when the press ram reaches the upper end of its stroke. As the press ram descends, fingers 52 move outwardly away from each other to release the part in response to actuator 40 shifting to the right relative to carriage 36. Thereafter when the abutment 72 at the left end of actuator 40 engages carriage 36, the carriage is retracted to the starting position shown in FIG. 1 in which position the press ram is at the bottom of its stroke.

While the above sequence of operation may be varied, nevertheless it is apparent that, as the press ram 12 approaches the bottom of its stroke, fingers 52 have to be retracted out of engagement with the workpieces 62 to enable the dies and punches to properly engage the workpieces. The specific improvement of this invention provides a means for frictionally engaging the workpieces in the die section of the apparatus before they are released by the fingers 52. These means are illustrated most clearly in FIGS. 3 and 4. The hold-down mechanism comprises two pair of C-shaped levers 74 located at opposite ends of the set of three dies illustrated and on opposite sides of the dies. Each lever 74 is pivotally supported as at 76 at its lower end. From the pivot point 76 each lever extends laterally outwardly and upwardly to a bight portion 78. The upper portion of each lever is designated 80 and extends laterally inwardly and downwardly terminating in a free end 82. The free ends 82 of each pair of levers are interconnected by a hold-down rod 84. Each lever 74 is biased by a spring detent assembly 86 such that the hold-down rods 84 are normally urged inwardly toward each other and downwardly to engage opposite edge portions of the workpieces 62 which rest upon the spring pads 70 of the dies. The means for rotating the levers 74 to swing the hold-down rods 84 out of the way when the ram descends comprises rollers 88 journalled on levers 74. Rollers 88 are adapted to be engaged by depending abutments 90 secured to the upper die plate 20. Abutments 90 are in the form of blocks having flat horizontally extending surfaces 92 which, as the ram approaches its lowermost position, are adapted to engage rollers 88 and cam them downwardly and outwardly about the pivot axes 76 as shown in FIG. 4. It will be observed that rollers 88 are mounted on levers 74 such that they are located upwardly and laterally outwardly of the pivot axes 76.

Abutments 90 are designed and positioned relative to rollers 88 such that the workpieces 62 are released by the hold-down rods 84 after the work-gripping fingers 52 have moved outwardly away from each other to release the workpieces. By proper design of levers 74 and the location of pivots 76 and rollers 88, hold-down rods 84 can be actuated to release the workpieces 62 just prior to being engaged by the punches. It will be noted that levers 74 are located beyond the ends of the dies and punches and their movement is thereby not restricted because of the size or shape of the punches and dies.

With the above described hold-down mechanism it will be observed that the hold-down rods 84 bear downwardly against the workpieces 62 on the spring pads 70 to frictionally hold them in place except at such time that the ram 12 of the press is located at or adjacent its lowermost position. Thus with this arrangement the workpieces are frictionally gripped by the hold-down rods 84 as they are being advanced by the work-gripping fingers 52. In addition, hold-down bars 84 continue to frictionally engage workpieces 62 while the workpieces are being released by the work-gripping fingers 52. By reason of the engagement of the workpieces by hold-down bars 84 both while the workpieces are being transferred and being released by fingers 52, the exact positioning of the workpieces as determined by the transfer mechanism is assured. Hold-down rods 84 prevent the workpieces from overshooting their desired positions in the dies and also prevent the workpieces from being shifted laterally when they are being released from engagement with the work-gripping fingers 52.

I claim:

1. For use in a punch press of the type having a die which includes a plurality of successive stations and a transfer mechanism for progressively advancing individual workpieces to the successive stations of the die upon each reciprocation of the press ram, the transfer mechanism being of the type which includes work-gripping elements which are adapted to grip a workpiece, advance it to the next successive station and then release the workpiece prior to the ram reaching the lower limit of its down stroke, means for retaining the workpiece in relatively fixed position while it is being released by the work-gripping elments comprising a hold-down member, a pivotal member supporting the hold-down member for swinging movement from a position engaging the workpiece at a station to a position out of engagement with the workpiece, means associated with the press ram and operative as the ram approaches the lower limit of its stroke to swing the hold-down member from said engaged to said disengaged position.

2. A hold-down mechanism as called for in claim 1 wherein the hold-down member is disposed at one end of said pivoted member and the latter is pivotally supported at the opposite end thereof.

3. A hold-down mechanism as called for in claim 1 wherein said hold-down member swings in a direction upwardly and laterally outwardly of the die from the engaged to the disengaged position.

4. A hold-down mechanism as called for in claim 1 including a lug on said pivoted member, said ram-associated means comprising an abutment fixed relative to and movable vertically with said ram as the latter approaches the lower end of its stroke, said lug in the engaged position of the hold-down being disposed in the path of travel of the abutment and engageable thereby to swing the hold-down from the engaged to the disengaged position.

5. The combination called for in claim 4 wherein said lug is disposed laterally outwardly of the pivot for said pivoted member.

6. The combination called for in claim 5 wherein said pivoted member comprises a C-shaped lever pivotally supported adjacent its lower end, said hold-down member being disposed adjacent its upper end, said lug being located intermediate the ends generally at the bight portion of the C.

7. A hold-down mechanism as called for in claim 1 including means biasing said pivoted member to the engaged position of the hold-down.

8. For use in a punch press of the type having a die which includes a plurality of successive stations and a transfer mechanism for progressively advancing individual workpieces to the successive stations upon each reciprocation of the press ram, the transfer mechanism being of the type which includes work-gripping elements which are adapted to grip a workpiece, advance it to the next successive station and then release the workpiece prior to the ram reaching the lower limit of its down stroke, a hold-down mechanism for retaining the workpiece in fixed position while it is being released by the work-gripping elements comprising a hold-down member movable from a position engaging the workpiece in a direction laterally outwardly to a released position, means normally biasing said hold-down member to the engaged position and means associated with said ram and operative as the ram reaches the lower limit of its stroke to engage said hold-down member and shift it to the released position against the force of said biasing means.

9. A hold-down mechanism as called for in claim 8 wherein said hold-down member comprises an element extending along and between said stations, said element extending beyond the stations at each end, movably mounted supporting means connected to the opposite ends of said element beyond the opposite end stations, said element in the engaged position being adapted to press downwardly on the workpieces at each station.

10. The combination called for in claim 9 wherein said element extends continuously between said supporting means in a straight line and being adapted to press down on the workpieces as they are being indexed between stations.

11. The combination called for in claim 9 including a lug on said supporting means, said ram-associated means comprising an abutment fixed relative to and movable with said ram as the ram approaches the lower end of its stroke and positioned to engage said lug and shift said hold-down member to the released position as the ram approaches the lower end of its stroke.

12. The combination set forth in claim 11 wherein said lug comprises a roller.

13. The combination set forth in claim 9 wherein each of said supporting means comprises a pivotally-supported lever.

14. The combination called for in claim 13 wherein said lug is disposed laterally outwardly of said hold-down element and the pivotal support for the lever.

References Cited
UNITED STATES PATENTS

| | | | |
|---|---|---|---|
| 1,778,824 | 10/1930 | Crane | 83—255 |
| 2,929,485 | 3/1960 | Wallis | 198—19 |

JAMES M. MEISTER, *Primary Examiner.*